E. HUNTER.
Coffee Pot.

No. 107,054. Patented Sept. 6, 1870.

Witnesses
W. T. Purris
Chas. F. Myers

Inventor.
Edward Hunter
By Attorney
G. B. Towles

United States Patent Office.

EDWARD HUNTER, OF NORWICH, CONNECTICUT, ASSIGNOR OF ONE-HALF HIS RIGHT TO HENRY H. GALLUP, OF SAME PLACE.

Letters Patent No. 107,054, dated September 6, 1870.

TEA-POT OR WATER-HEATER.

The Schedule referred to in these Letters Patent and making part of the same

I, EDWARD HUNTER, of Norwich, in the county of New London and State of Connecticut, have invented a new and improved Tea and Coffee-Pot or Water-Heater, of which the following is a specification.

Nature and Objects of the Invention.

My invention relates to the mode of constructing a tea and coffee-pot or water-heater in such manner and form that when the said pot is placed over the fire of a stove or other similar heater, or over a lighted lamp or gas flame, or other heated or burning material, the heat will be directly conducted to a larger surface of the tea and coffee-pot or water-heater than when said pots are constructed in the usual and ordinary forms.

The object of this invention is to economize time and heat in the preparation of tea and coffee, or in the heating of water and other liquids.

Description of the Accompanying Drawing.

Figure 1:
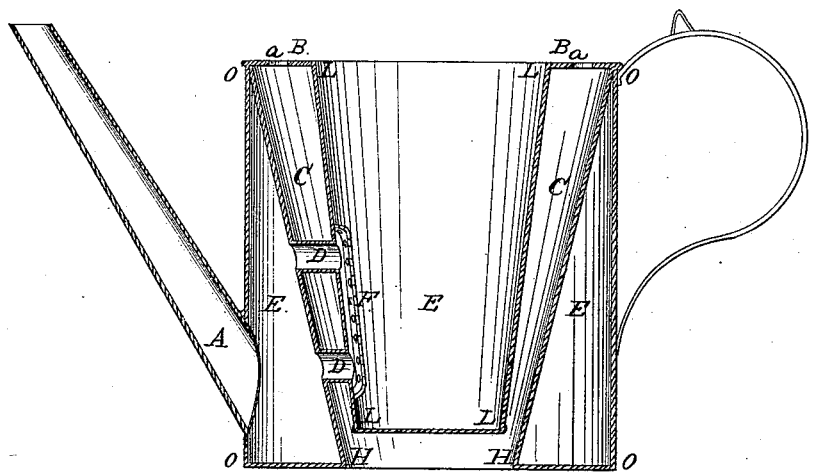
Figure 2:
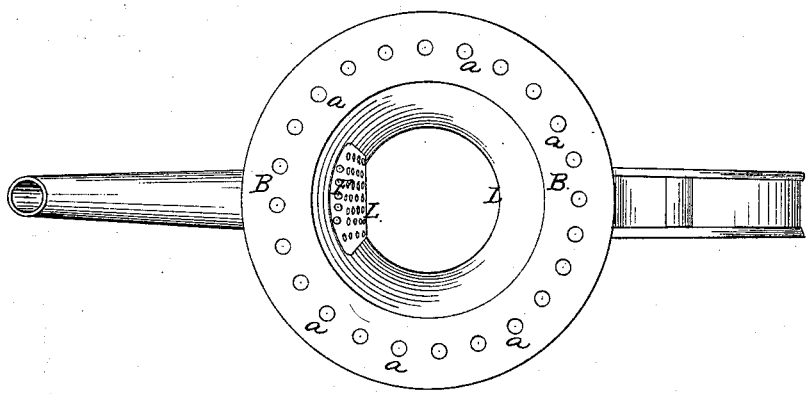

Figure 1 is a vertical section.
Figure 2 is a plan view.
Like letters in both figures of the drawing indicate like parts.

General Description.

To enable those skilled in the manufacture of tea and coffee-pots, water-heaters, and other similar articles, to understand my invention, and the manner of constructing the same, the following is a more complete and general description.

O O and O O, fig. 1, represent the outside of an ordinary tea and coffee-pot or water-heater, made of tin, Brittania, copper, or any other proper material.

I then form around the interior of such pot, with the same or similar material, the apartment or vessel O H O, as represented in the drawing, the base line H O forming a part of the base or bottom of the pot.

Inside of the chamber thus shaped and formed, I place the vessel or chamber L L L L, the sides of which may be parallel to the interior sides of the chamber O H O, or as represented in fig. 1, and the exterior of which vessel is distant from the partition H C O, as represented in the air-channel C.

The base of this inner chamber L L, with the base of the exterior chamber at H O, form the base of the tea and coffee-pot or water-heater.

This interior vessel or chamber is secured to the other portions of the pot by the top B, which is more clearly shown in fig. 2, which top is perforated, as appears in the drawing, with holes, a, opening into the interior air-channel or passage-way C C, which holes create a draught for the heat up through said interior air-channel.

The interior chamber is also secured and steadied in position by the hollow tubes or pipes D D moving across the interior channel C C, at the base of the nose of the pot A, as represented in the drawing.

I place these tubes or pipes, which may be made of tin, copper, or other proper material, and which are about a half-inch in diameter, one inch apart, as represented in the drawing, to distribute the contents of the pot to its interior and exterior chambers E E, and the screen is so placed on the side of the interior of the center vessel or chamber as to cover the mouths of the tubes D D, as represented at F.

One or more tubes may be inserted, of a lesser or greater diameter, between the inner and outer chambers, and at other points between the chambers, if desired.

The tea or coffee, or other material to be cooked or heated, is placed in the center chamber of the pot, over which there is a lid or cover like any ordinary lid or cover. The liquid so placed finds its level in the exterior chamber through the passage-tubes D D at F.

Having placed the pot above the fire, the heat not only acts on the base of the pot, as on ordinary tea and coffee-pots and water-heaters, but through the heating-channel, it also acts on the entire surface of both chambers of the pot adjoining the channel, as also on the tubes or pipes D D, by which arrangement a surface of the pot is brought into direct contact with the applied heat, equal to five times the surface exposed to direct heat in ordinary tea and coffee-pots and water-heaters.

The pot may be constructed within an interior basin at the bottom, so that heat may be applied from the flame of a lamp, gas-jet, or other burning-spirits.

Claim.

I claim as my invention—

The combination of the interior and exterior chambers E E E, with the tubes or pipes D D, and strainer F, when taken in connection with the heat-channel C C, and the top B B, with perforated draught-holes, as represented, substantially as and for the purpose hereinbefore set forth.

EDWARD HUNTER.

Witnesses:
JAMES B. COIT,
JOHN E. WARD.